US012618423B2

(12) United States Patent
Luo et al.

(10) Patent No.: US 12,618,423 B2
(45) Date of Patent: May 5, 2026

(54) OIL DRAIN VALVE, ENERGY ACCUMULATION DEVICE, HYDRAULIC SYSTEM AND WORKING MACHINE

(71) Applicant: SANY AUTOMOBILE MANUFACTURING CO. LTD, Changsha (CN)

(72) Inventors: Bin Luo, Changsha (CN); Guangyu Su, Changsha (CN); Fengwei Wang, Changsha (CN)

(73) Assignee: SANY AUTMOBILE MANUFACTURING CO. LTD, Changsha (CN)

( * ) Notice: Subject to any disclaimer, the term of this patent is extended or adjusted under 35 U.S.C. 154(b) by 196 days.

(21) Appl. No.: 18/596,311

(22) Filed: Mar. 5, 2024

(65) Prior Publication Data

US 2024/0209874 A1 Jun. 27, 2024

Related U.S. Application Data

(63) Continuation of application No. PCT/CN2022/073532, filed on Jan. 24, 2022.

(30) Foreign Application Priority Data

Sep. 29, 2021 (CN) .......................... 202111154736.0

(51) Int. Cl.

| | |
|---|---|
| ***F15B 13/04*** | (2006.01) |
| ***F15B 1/04*** | (2006.01) |
| ***F15B 21/00*** | (2006.01) |

(52) U.S. Cl.

CPC ............ *F15B 13/0401* (2013.01); *F15B 1/04* (2013.01); *F15B 21/005* (2013.01); (Continued)

(58) Field of Classification Search

CPC ...... F15B 21/005; F15B 1/04; F15B 2201/41; F15B 13/0401; F15B 2201/411; (Continued)

(56) References Cited

U.S. PATENT DOCUMENTS 2,043,453 A * 6/1936 Vickers ................ G05D 16/166 60/462
2,102,865 A * 12/1937 Vickers ............... F15B 13/0417 60/494

(Continued)

FOREIGN PATENT DOCUMENTS

CN 1039476 A 2/1990
CN 102518608 A 6/2012

(Continued)

OTHER PUBLICATIONS

International Search Report and Written Opinion issued in corresponding PCT Application No. PCT/CN2022/073532, dated Jun. 29, 2022.

(Continued)

*Primary Examiner* — Craig J Price
(74) *Attorney, Agent, or Firm* — Westbridge IP LLC

(57) ABSTRACT

Disclosed are an oil drain valve, an energy accumulation device, a hydraulic system and a working machine. The oil drain valve includes a valve body, a valve core and an elastic element. The valve body is provided with a first oil port and a second oil port, the valve core is communicated with the first oil port and the second oil port, and the valve core is movable in the valve body to switch from a first working position to a second working position. The elastic element is provided between a first end of the valve core and the valve body, the first end of the valve core is communicated with the first oil port, and a second end of the valve core is communicated with the second oil port.

9 Claims, 4 Drawing Sheets

(52) U.S. Cl.
CPC . *F15B 2201/41* (2013.01); *F15B 2211/40507* (2013.01); *F15B 2211/40515* (2013.01); *F15B 2211/4053* (2013.01)

(58) Field of Classification Search
CPC ...... F15B 2211/41572; F15B 2211/212; F15B 2211/40515; F15B 2211/428; F15B 2211/413; F15B 13/0407; F15B 13/0402; F15B 13/042; F15B 2211/4053; F15B 2211/40507; F16K 47/01
USPC .... 137/460, 498, 504, 509, 517, 514–514.7, 137/513.3–513.7, 625.12–625.16, 137/625.28–625.39, 628–630.22, 375
See application file for complete search history.

(56) References Cited

U.S. PATENT DOCUMENTS 2,164,669 A * 7/1939 Thomas .............. F16K 17/0433 137/538
2,618,121 A * 11/1952 Tucker .................... F15B 13/01 91/461
2,666,451 A * 1/1954 Ray ......................... F16K 31/42 251/75
2,872,939 A * 2/1959 Terry ...................... F16K 39/04 251/282
2,891,760 A * 6/1959 Dewar .................. F16K 31/406 251/44
3,072,107 A * 1/1963 Cassell ..................... B66B 1/04 91/443
3,112,764 A * 12/1963 Anderson ................. F16K 3/26 251/282
3,120,243 A * 2/1964 Allen ...................... F16K 15/00 137/625.3
3,349,669 A * 10/1967 Richardson ............. B30B 15/24 83/624
3,381,708 A * 5/1968 Chenoweth ............. F16K 3/265 137/504
3,411,416 A * 11/1968 Herd ................... F15B 13/0417 91/452
3,424,196 A * 1/1969 Donner ................ G05D 7/0133 137/504
3,592,216 A * 7/1971 McMillen ........... F15B 13/0417 137/115.14
3,659,498 A * 5/1972 Richardson ........... F15B 13/022 91/452
3,693,506 A * 9/1972 McMillen ................ B62D 5/09 137/115.14
3,728,941 A * 4/1973 Cryder .................. F15B 11/003 137/504
3,780,531 A * 12/1973 Blair ....................... F01K 25/04 251/282
3,794,063 A * 2/1974 Carroll ...................... F16K 3/26 137/625.3
3,896,844 A * 7/1975 Schumacher ........... F16K 17/10 137/488
3,921,390 A * 11/1975 Stoltman ................... F02C 7/10 60/39.23
3,926,213 A * 12/1975 Carder ................. G05D 7/0133 137/504
3,960,172 A * 6/1976 Blake ...................... F16D 48/02 137/504
4,147,177 A * 4/1979 Iwatsuki ................ G05D 7/014 137/504
4,193,263 A * 3/1980 Ille ........................ F15B 11/165 60/420
4,237,922 A * 12/1980 Maier .................. G05D 7/0133 137/493
4,240,457 A * 12/1980 Riediger .................. B62D 5/32 137/115.06
4,294,278 A * 10/1981 Blake .................. F16D 48/0206 137/118.01
4,434,708 A * 3/1984 Bowden ................ F15B 13/021 91/454
4,506,503 A * 3/1985 Ogborne ................... F02C 9/28 60/39.281
4,995,422 A * 2/1991 Chew ................... G05D 7/0146 137/504
5,752,426 A * 5/1998 Ikei ....................... E02F 9/2267 137/596.2
6,135,135 A * 10/2000 Futa, Jr. ................. G05D 16/10 137/115.03
6,516,614 B1 * 2/2003 Knoll .................... F15B 11/163 60/452
7,201,183 B2 * 4/2007 Thoms .................. F16K 17/196 137/493.9
7,487,706 B2 * 2/2009 Vallebrant ............... B27B 17/08 91/445
7,621,211 B2 * 11/2009 Ma ........................ F16K 31/406 251/30.04
8,118,052 B2 * 2/2012 Swab .................... B29C 44/367 137/504
8,123,081 B2 * 2/2012 Swab .................... B29B 7/7404 222/145.2
8,205,636 B2 * 6/2012 Kuromusha ........... G05D 16/10 251/117
8,225,815 B2 * 7/2012 Valtr .................... G05D 7/0133 137/504
8,256,739 B2 * 9/2012 Pfaff ..................... F16K 31/406 251/30.02
8,276,611 B2 * 10/2012 Swab .................... B29B 7/7404 137/497
8,424,836 B2 * 4/2013 Ma ........................ F16K 31/406 251/44
8,662,097 B2 * 3/2014 Imhof .................... G05D 7/005 137/115.15
8,870,152 B2 * 10/2014 Nagata .................. F16K 31/408 251/30.04
9,091,355 B2 * 7/2015 Albrecht ............... F16K 17/046
9,464,723 B2 * 10/2016 Martin ...................... F16K 1/36
9,803,714 B2 * 10/2017 Rubitzko .............. F16F 9/3271
9,945,275 B2 * 4/2018 Kishi ........................ F01M 1/16
10,126,762 B2 * 11/2018 Loos .................... G05D 7/0126
10,220,397 B2 * 3/2019 Swab .................... B05B 7/0025
10,731,771 B2 * 8/2020 Sobieszek ........... F16K 31/1221
10,788,145 B2 * 9/2020 Povey ..................... F16K 1/123
11,933,419 B2 * 3/2024 Sutar ..................... F16K 31/406
12,173,731 B2 * 12/2024 Ishikawa ............. F15B 13/0405
12,331,763 B2 * 6/2025 Verho ................... F15B 11/165
12,466,566 B2 * 11/2025 John ...................... B64D 25/14
2007/0290152 A1 * 12/2007 Ma ........................ F16K 31/406 251/30.01
2009/0013972 A1 * 1/2009 Wilson ............... F02M 37/0047 123/514
2010/0069517 A1 * 3/2010 Swab .................... B29C 44/367 521/95
2011/0121034 A1 * 5/2011 Swab .................... B05B 7/0025 222/145.1
2011/0197979 A1 * 8/2011 Imhof .................... G05D 7/005 137/528
2012/0174993 A1 * 7/2012 McHugh ............... E21B 34/025 137/511
2013/0152883 A1 * 6/2013 Perotto ..................... F01P 3/10 123/41.35
2016/0116004 A1 * 4/2016 Ikeda .................... F16K 31/408 137/625.25
2018/0372210 A1 * 12/2018 Poster ................. F16K 37/0041
2019/0234431 A1 * 8/2019 Tanaka .................. F15B 11/044
2022/0196181 A1 * 6/2022 Saldanha ............... B64D 25/14
2022/0380058 A1 * 12/2022 John ...................... B64D 25/14

FOREIGN PATENT DOCUMENTS

CN 102654149 A 9/2012
CN 202545402 U 11/2012
CN 110219848 A 9/2019
CN 113883116 A 1/2022
CN 215927970 U 3/2022

(56) References Cited

FOREIGN PATENT DOCUMENTS

| | | | |
|---|---|---|---|
| DE | 2838940 | A1 | 3/1980 |
| DE | 3145118 | A1 | 5/1983 |
| DE | 102006038472 | A1 | 3/2008 |
| JP | S53152225 | U | 11/1978 |
| JP | 2016223498 | A | 12/2016 |
| WO | 2012021101 | A1 | 2/2012 |

OTHER PUBLICATIONS

First Office Action issued in counterpart Chinese Patent Application No. 202111154736.0, dated Nov. 29, 2024.
Extended European Search Report issued in counterpart European Patent Application No. 22874063.5, dated Jun. 23, 2025.
Notification to Grant Patent Right for Invention issued in counterpart Chinese Patent Application No. 202111154736.0, dated Jun. 19, 2025.
Second Office Action issued in counterpart Chinese Patent Application No. 202111154736.0, dated Apr. 25, 2025.

* cited by examiner

OIL DRAIN VALVE, ENERGY ACCUMULATION DEVICE, HYDRAULIC SYSTEM AND WORKING MACHINE

CROSS-REFERENCE TO RELATED APPLICATIONS

This application is a continuation application of International Application No. PCT/CN2022/073532, filed on Jan. 24, 2022, which claims priority to Chinese Patent Application No. 202111154736.0, filed on Sep. 29, 2021. The disclosures of the above-mentioned applications are incorporated herein by reference in their entireties.

TECHNICAL FIELD

The present application relates to the technical field of hydraulic systems, and in particular to an oil drain valve, an energy accumulation device, a hydraulic system and a working machine.

BACKGROUND

At present, in some hydraulic systems, accumulators are usually installed to store or recover hydraulic energy in the hydraulic system and release it in response to that needed to save energy.

For example, during the operation of concrete pumping equipment, a set of hydraulic cylinders in the hydraulic system drive the S-tube valve to reciprocate in the hopper. Such that the concrete in the hopper is transported into the concrete pumping pipe through the delivery cylinder to realize the delivery of concrete. An accumulator is provided on the oil inlet line of the hydraulic cylinder, which collects hydraulic energy in response to that the accumulator is filled with oil, and replenishes hydraulic oil to the hydraulic cylinder in response to that the accumulator is drained.

However, in the related art, the hydraulic oil flow output by the accumulator in the hydraulic system is not controlled during the oil discharge process. At the end of the cylinder stroke, the piston usually stops under the action of rigid impact force, which is easy to damage the cylinder.

SUMMARY

The main purpose of the present application is to provide an oil drain valve, an energy accumulation device, a hydraulic system and a working machine, aiming to solve the problem in the related art that the accumulator of the hydraulic system easily causes impact damage to the oil cylinder during the oil discharge process.

The present application provides an oil drain valve including a valve body, a valve core and an elastic element. The valve body is provided with a first oil port and a second oil port, and the valve core is provided between the first oil port and the second oil port; the valve core is communicated with the first oil port and the second oil port, and the valve core is movable in the valve body to switch from a first working position to a second working position; the elastic element is provided between a first end of the valve core and the valve body, the first end of the valve core is communicated with the first oil port, and a second end of the valve core is communicated with the second oil port.

In response to that hydraulic oil in the oil drain valve flows from the first oil port to the second oil port, the valve core is configured to switch from the second working position to the first working position under an action of the elastic element.

In response to that the hydraulic oil in the oil drain valve flows from the second oil port to the first oil port, the valve core is configured to compress the elastic element and switch from the first working position to the second working position.

A flow quantity of the oil drain valve in response to that the valve core operates in the second working position is less than a flow quantity of the oil drain valve in response to that the valve core operates in the first working position.

In the oil drain valve according to some embodiments, in response to that the valve core operates in the first working position and the second working position, the elastic element is in a compressed state, and an elastic force of the elastic element in response to that the valve core operates in the first working position is smaller than an elastic force in response to that the valve core operates in the second working position.

In the oil drain valve according to some embodiments, a limiter is provided on the valve body, and in response to that the valve core operates in the first working position, the limiter prevents the valve core from moving away from the second working position.

In some embodiments, an oil passage is provided in the valve body; a first back cavity is formed between the first end of the valve core and the valve body, and the elastic element is provided in the first back cavity; the oil passage is configured to communicate with the first back cavity and the first oil port to form a first feedback oil path; and the second end of the valve core is provided with a cavity communicated with the second oil port; a side wall of the cavity is provided with a first oil hole, and the cavity is communicated with the first oil port through the first oil hole; an open degree of the first oil hole in response to that the valve core operates in the first working position is larger than an open degree of the first oil hole in response to that the valve core operates in the second working position.

In the oil drain valve according to some embodiments, the oil drain valve further includes a damping element provided on the first feedback oil path.

In the oil drain valve according to some embodiments, the damping element is any one of a damping hole, a damper and an electronically controlled proportional flow valve.

In the oil drain valve according to some embodiments, the damper is an adjustable damper.

In the oil drain valve according to some embodiments, the valve body includes a valve seat and a valve sleeve; the first oil port and the second oil port are both provided on the valve seat, and the valve seat is provided with a valve core cavity; the valve sleeve is fixedly provided in the valve core cavity, and the valve core is slidably provided in the valve sleeve; a second oil hole is provided on a side wall of the valve sleeve, and the second oil hole is communicated with the first oil port and the first oil hole.

In the oil drain valve according to some embodiments, the first back cavity is formed between the first end of the valve core and a first end of the valve sleeve; the valve sleeve is provided with a damping hole, and the damping hole is communicated with the first back cavity and the oil passage.

In the oil drain valve according to some embodiments, an inner surface of the valve core cavity is provided with a first annular guide groove, and an inner surface of the valve sleeve is provided with a second annular guide groove; the first oil port, the first annular guide groove, the second oil hole and the second annular guide groove are communicated with the first oil hole in sequence; and the first oil hole includes a plurality of first through holes provided on the side wall of the cavity and distributed along a circumferential direction of the valve core, and the second oil hole includes a plurality of second through holes provided on the side wall of the valve sleeve and distributed along a circumferential direction of the valve sleeve.

In the oil drain valve according to some embodiments, the first oil hole includes a plurality of first through holes provided on the side wall of the cavity and distributed along an axial direction of the valve core, and a diameter of a first through hole near the second end of the valve core is smaller than a diameter of a first through hole away from the second end of the valve core.

In the oil drain valve according to some embodiments, the elastic element is a return spring.

The present application further provides an energy accumulation device, including an accumulator and the above-mentioned oil drain valve. The oil drain valve is installed at an oil outlet of the accumulator, and the oil outlet of the accumulator is communicated with the second oil port.

The present application further provides a hydraulic system including an oil pump, an actuator, an accumulator and the above-mentioned oil drain valve. The first oil port is communicated with an oil outlet of the oil pump and a working oil port of the actuator respectively, and the second oil port is communicated with an oil outlet of the accumulator; or the hydraulic system includes an oil pump, an actuator and the above-mentioned energy accumulation device. The present application further provides a working machine.

The present application provides an oil drain valve, an energy accumulation device, a hydraulic system and a working machine. The first oil port and the second oil port on the valve body are communicated through the valve core, the first end of the valve core is communicated to the first oil port to form a first feedback oil path, and the second end of the valve core is communicated to the second oil port to form a second feedback oil path. An elastic element is provided between the first end of the valve core and the valve body, so that in response to that the flow direction of the hydraulic oil in the oil drain valve changes, the working position of the valve core can be automatically switched, and the hydraulic oil quantity flowing through the oil drain valve is changed through the flow settings of different working positions to achieve automatic control of the output flow quantity. In response to that the second oil port of the oil drain valve is communicated with the oil outlet of the accumulator, the accumulator switches from oil charging to oil discharge, and the oil drain flow quantity of the oil drain valve can be reduced by automatically switching the working position, thereby preventing the actuator from being damaged due to rigid impact.

BRIEF DESCRIPTION OF THE DRAWINGS

In order to more clearly illustrate the technical solutions in some embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

DETAILED DESCRIPTION OF THE EMBODIMENTS

In order to make the purpose, technical solutions and advantages of this application clearer, the technical solutions of embodiments of the present application will be clearly and completely described with reference to the drawings in some embodiments of the present application. Obviously, the described embodiments are only some rather than all of the embodiments of the present application. Based on the embodiments of the present application, all other embodiments obtained by those skilled in the art without creative efforts shall fall within the scope of the present application.

In the description of the embodiments of the present application, it should be noted that, unless otherwise clearly stated and limited, the terms "first" and "second" are used to clearly illustrate the numbering of product components and do not represent any substantive difference. The directions of "left" and "right" are subject to the directions shown in the attached drawings. For those skilled in the art, the specific meanings of the above terms in the embodiments of the present application can be understood according to specific circumstances.

In the description of the present application, it should be noted that, unless otherwise clearly stated and limited, the terms "installation", "connection" and "communication" should be understood in a broad sense. For example, it can be a fixed connection or a detachable connection; it can be integrally connected; it can be directly connected, or indirectly connected through an intermediate medium, or it can be internal connection between two components. For those skilled in the art, the specific meanings of the above terms in the present application can be understood according to specific circumstances.

The oil drain valve and the energy accumulation device provided in the present application will be described with reference to FIG. 1 to FIG. 5.

Figure 1:
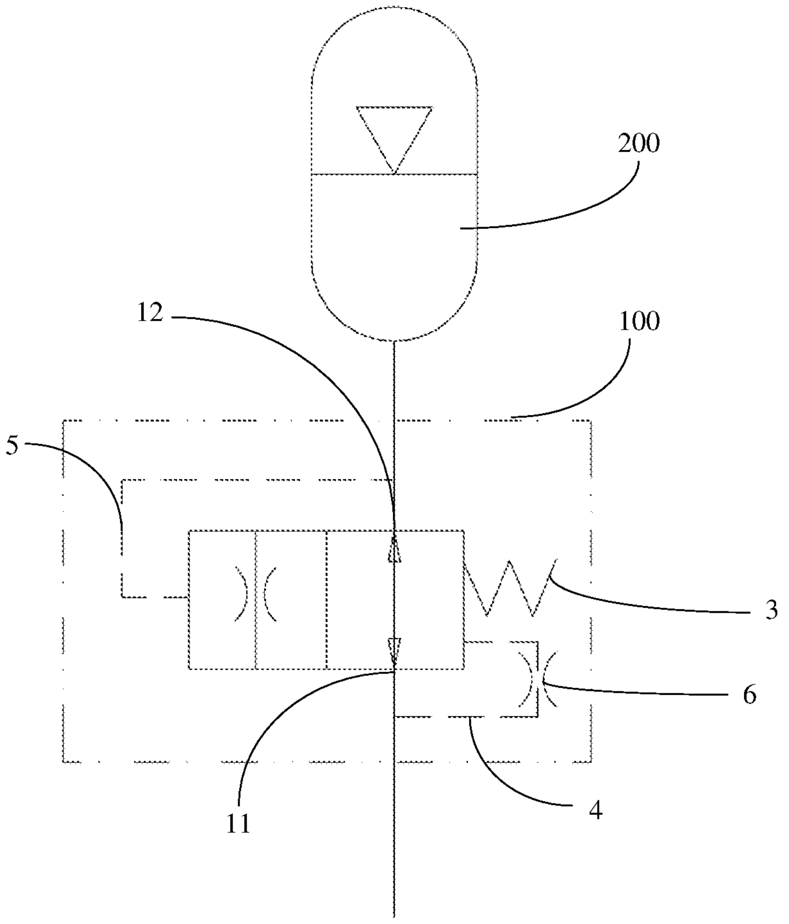
FIG. 1 is a schematic view of working principle of an oil drain valve according to some embodiments of the present application.
Figure 2:
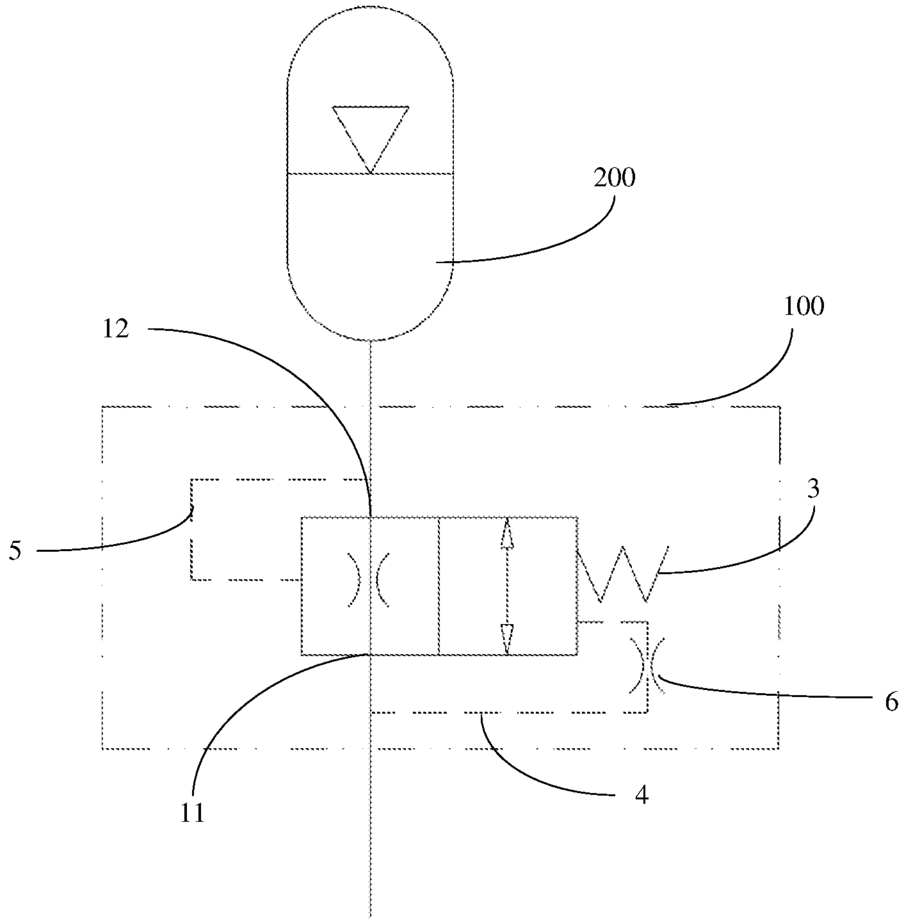
FIG. 2 is a schematic view of working principle of the oil drain valve according to some other embodiments of the present application.
Figure 3:
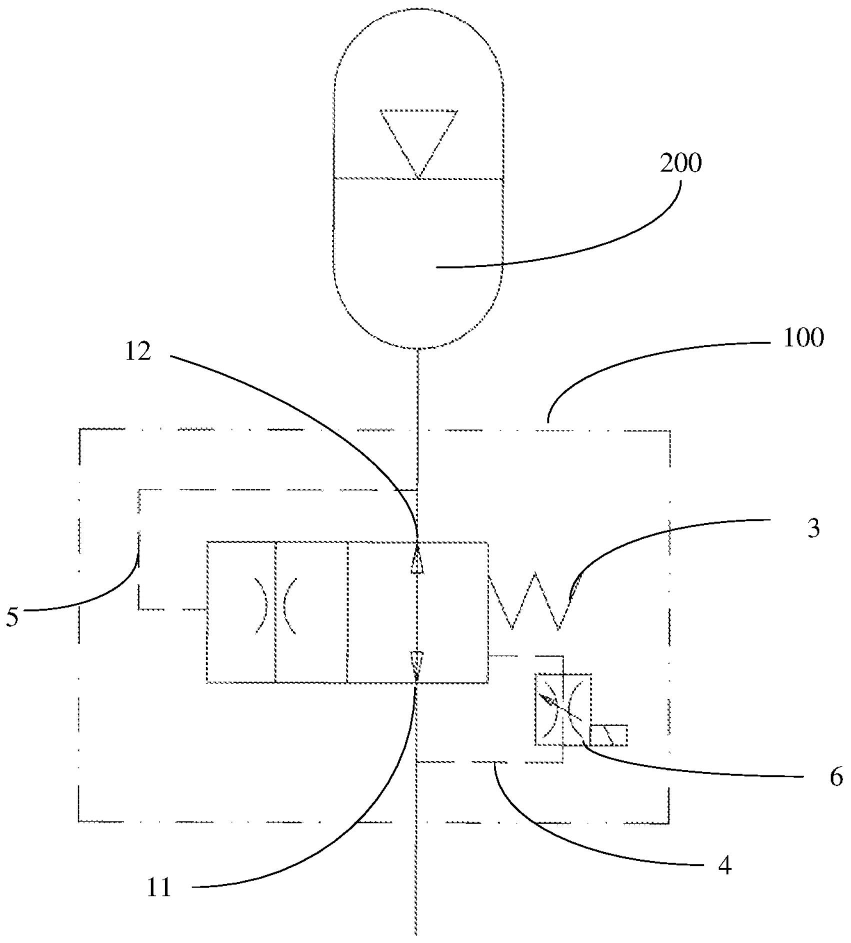
FIG. 3 is a schematic view of working principle of the oil drain valve according to yet some other embodiments of the present application.
Figure 4:
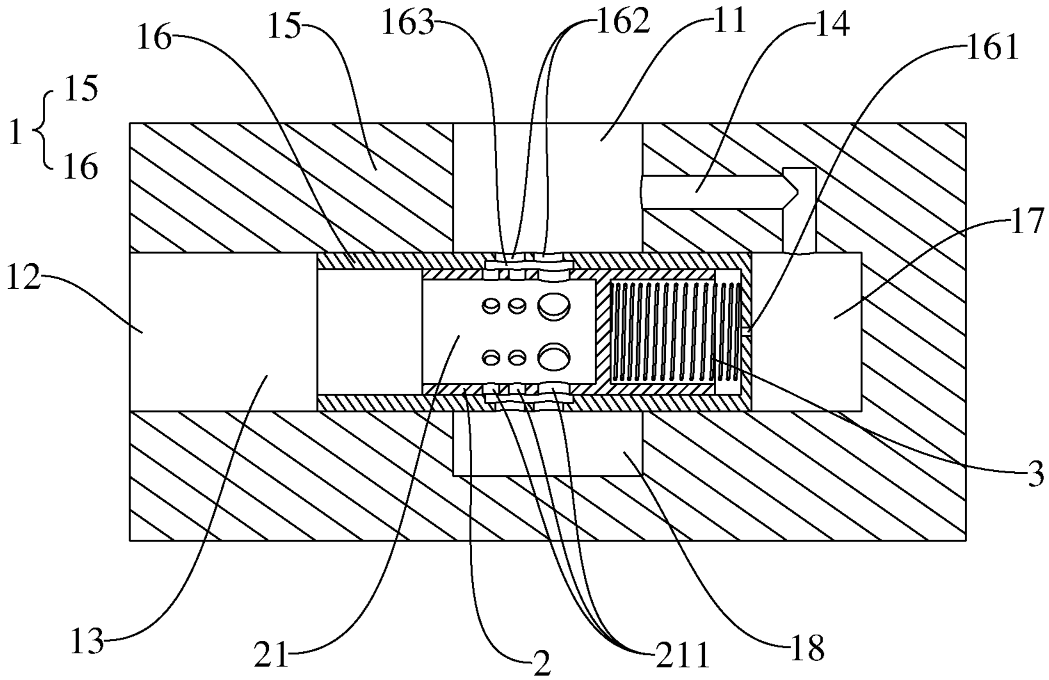
FIG. 4 is a schematic structural view of the oil drain valve according to some embodiments of the present application.
Figure 5:
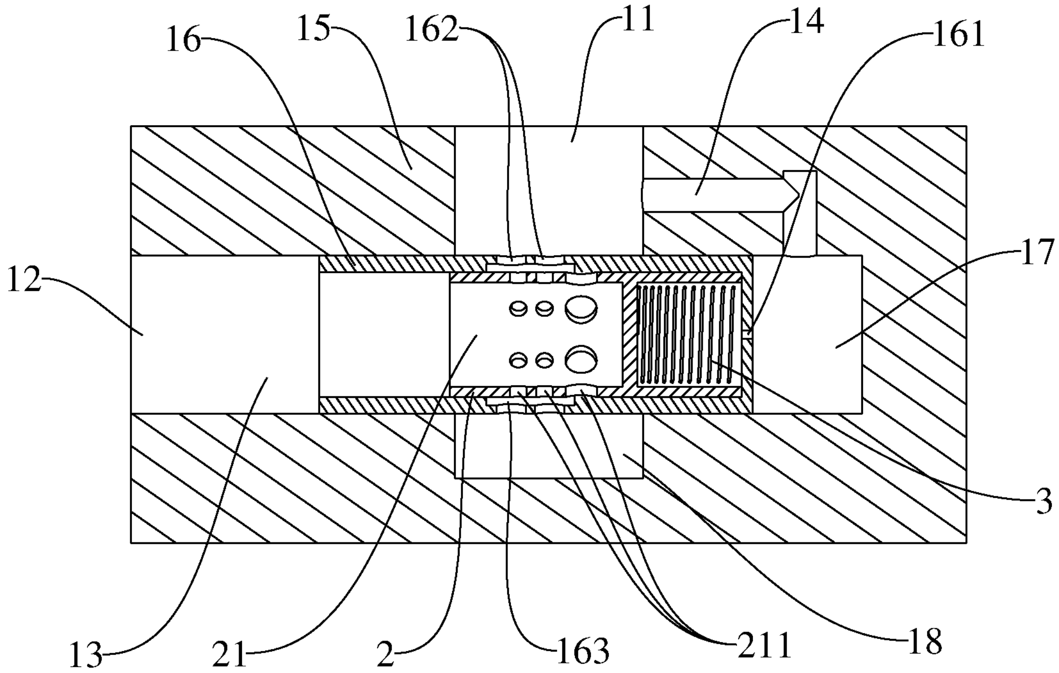
FIG. 5 is a schematic structural view of the oil drain valve according to some other embodiments of the present application.

FIG. 1 is a schematic view of working principle of an oil drain valve according to some embodiments of the present application; FIG. 2 is a schematic view of working principle of the oil drain valve according to some other embodiments of the present application; FIG. 3 a schematic view of working principle of the oil drain valve according to yet some other embodiments of the present application; FIG. 4 is a schematic structural view of the oil drain valve according to some embodiments of the present application; FIG. 5 is a schematic structural view of the oil drain valve according to some other embodiments of the present application.

In some embodiments of the present application, the oil drain valve 100 provided includes a valve body 1, a valve core 2 and an elastic element 3. The valve body 1 is provided with a first oil port 11 and a second oil port 12, the valve core

2 is provided between the first oil port 11 and the second oil port 12, the valve core 2 is communicated with the first oil port 11 and the second oil port 12, and the valve core 2 is movable in the valve body 1 to switch 2 from a first working position to a second working position. The elastic element 3 is provided between a first end of the valve core 2 and the valve body 1, the first end of the valve core 2 is communicated with the first oil port 11, and a second end of the valve core 2 is communicated with the second oil port 12.

FIG. 1 and FIG. 4 show a state in which the valve core 2 of the oil drain valve 100 is in the first working position. FIG. 2 and FIG. 5 show a state in which the valve core 2 of the oil drain valve 100 is in the second working position. In response to that hydraulic oil in the oil drain valve 100 flows from the first oil port 11 to the second oil port 12, the valve core 2 moves from the second working position to the first working position under an action of the elastic element 3; and in response to that the hydraulic oil in the oil drain valve 100 flows from the second oil port 12 to the first oil port 11, the valve core 2 is configured to compress the elastic element 3 and move from the first working position to the second working position. A flow quantity of the oil drain valve 100 in response to that the valve core 2 operates in the second working position is less than a flow quantity of the oil drain valve 100 in response to that the valve core 2 operates in the first working position.

The cavity formed between the first end of the valve core 2 and the valve body 1 is communicated with the first oil port 11 to form the first feedback oil path 4. The cavity formed between the second end of the valve core 2 and the valve body 1 is communicated with the second oil port 12 to form a second feedback oil path 5. The elastic element 3 is provided in the cavity formed between the first end of the valve core 2 and the valve body 1.

The oil drain valve provided in these embodiments of the present application can be installed on the oil outlet of the accumulator 200, so that the oil outlet of the accumulator 200 is communicated to the oil inlet of the actuator through the oil drain valve 100. In response to that in use, the second oil port 12 is used to communicate with the oil outlet of the accumulator 200, and the first oil port 11 is used to communicate with the working oil port of the actuator and the oil outlet of the oil pump. The oil charged and oil discharged of the accumulator 200 both pass through the oil drain valve 100. In response to that charging oil, the oil pump pumps hydraulic oil to the accumulator 200 for energy storage. In response to that discharging oil, the accumulator 200 replenishes hydraulic energy to the actuator. The oil drain valve 100 controls the amount of hydraulic oil output from the accumulator 200.

As shown in FIG. 1 and FIG. 4, in response to that the hydraulic oil in the oil drain valve 100 flows from the first oil port 11 to the second oil port 12, that is, the first oil port 11 serves as the oil inlet, and the second oil port 12 serves as the oil outlet. In response to that the valve core 2 operates in the first working position, the oil drain valve 100 is in an oil-charging state, and the accumulator 200 is charged with oil.

As shown in FIG. 2 and FIG. 5, in response to that the hydraulic oil flow direction in the oil drain valve 100 is switched from the direction of the first oil port 11 to the second oil port 12 to the direction of the second oil port 12 to the first oil port 11, that is to say, the second oil port 12 serves as the oil inlet, and the first oil port 11 serves as the oil outlet, the oil drain valve 100 switches from the oil charging state to the oil discharging state, and the valve core 2 can switch from the first working position to the second working position, so that the flow quantity of the hydraulic oil is reduced.

In some embodiments, in response to that the oil drain valve 100 is in a stable oil-charging state, the valve core 2 operates in the first working position. At this time, the hydraulic pressure exerted by the hydraulic oil in the first feedback oil path 4 on the first end of the valve core 2 is equal to the hydraulic pressure exerted by the hydraulic oil in the second feedback oil path 5 on the second end of the valve core 2. Usually, the accumulator 200 will have a pressure maintaining phase after the oil charging is completed. In the pressure maintaining state, the hydraulic pressure on both ends of the valve core 2 is also equal. In response to that the oil drain valve 100 is in the oil-charging state and the pressure-maintaining state, the elastic element 3 exerts a force to the left on the first end of the valve core 2 to keep the valve core 2 working in the first working position.

In response to that the oil drain valve 100 switches from the oil charging state to the oil discharging state, since the flow direction of the hydraulic oil changes, the force exerted by the hydraulic oil in the first feedback oil path 4 on the second end of the valve core 2 is greater than the force exerted by the hydraulic oil in the second feedback oil path 5 on the first end of the valve core 2, thus pushing the valve core 2 to move to the second working position, thereby reducing the output flow of the oil drain valve 100.

In response to that the valve core 2 operates in the second working position, in response to that the hydraulic oil flow direction in the oil drain valve 100 is switched from the direction of the second oil port 12 to the first oil port 11 to the direction of the first oil port 11 to the second oil port 12, the oil drain valve 100 switches from the oil discharging state to the oil charging state. At this time, since the flow direction of the hydraulic oil changes, the force exerted by the hydraulic oil in the first feedback oil path 4 on the first end of the valve core 2 is greater than the force exerted by the hydraulic oil in the second feedback oil path 5 on the second end of the valve core 2, thus pushing the valve core 2 to compress the elastic element, making the valve core 2 move from the second working position to the first working position, thereby charging oil to the accumulator 200 with a large flow quantity.

In the oil drain valve provided in these embodiments of the present application, the first oil port 11 and the second oil port 12 on the valve body 1 are communicated through the valve core 2. The first end of the valve core 2 is communicated with the first oil port 11 to form a first feedback oil path 4, and the second end of the valve core 2 is communicated with the second oil port 12 to form a second feedback oil path 5. An elastic element 3 is provided between the first end of the valve core 2 and the valve body 1, so that in response to that the flow direction of the hydraulic oil in the oil drain valve 100 changes, the working position of the valve core 2 can be automatically switched, and the flow quantity of the hydraulic oil flowing through the oil drain valve 100 can be changed through the flow settings of different working positions thereby automatically controlling the output flow quantity. In response to that the second oil port 12 of the oil drain valve 100 is communicated to the oil outlet of the accumulator 200, the oil drain flow quantity of oil drain valve 100 can be reduced by automatically switching the working position in response to that the accumulator 200 is switched from oil charging to oil discharge, thereby preventing damage to the actuator caused by rigid impact.

In some embodiments of the present application, in response to that the valve core 2 is working in the first working position and the second working position, the elastic element 3 is in a compressed state, and an elastic force of the elastic element 3 in response to that the valve core 2 operates in the first working position is smaller than an elastic force in response to that the valve core 2 operates in the second working position. In response to that the valve core 2 operates in the first working position, the elastic restoring force of the elastic element 3 is used to limit the valve core 2 to the first working position. In response to that the valve core 2 switches from the first working position to the second working position, the elastic element 3 is compressed.

The elastic element 3 can be a return spring or a return elastic piece, which can produce an elastic restoring force on the valve core 2 to limit the valve core 2 at the first working position. One end of the return spring is in contact with the first end of the valve core 2, and the other end of the return spring is in contact with the valve body 1.

In some embodiments, a limiter (not shown) is provided on the valve body 1, and in response to that the valve core 2 operates in the first working position, the limiter prevents the valve core 2 from moving away from the second working position. In response to that the valve core 2 operates in the first working position, the elastic element 3 pushes the valve core 2 in abutment with the limiter, that is to say, the valve core 2 is limited between the elastic element 3 and the limiter. The valve body 1 is provided with a valve core cavity 13, and the limiter can be a limit boss or a limit convex ring protruding from the inner wall of the valve core cavity 13; or the limiter can be a circlip provided on the inside of the valve core cavity 13.

As shown in FIG. 4 and FIG. 5, in some embodiments, an oil passage 14 is provided in the valve body 1. A first back cavity is formed between the first end of the valve core 2 and the valve body 1, the elastic element 3 is provided in the first back cavity, and the oil passage 14 is configured to communicate the first back cavity and the first oil port 11 to form a first feedback oil path 4. The second end of the valve core 2 is provided with a cavity 21 communicated with the second oil port 12, a side wall of the cavity 21 is provided with a first oil hole 211, the cavity 21 is communicated with the first oil port 11 through the first oil hole 211, and an open degree of the first oil hole 211 in response to that the valve core 2 operates in the first working position is larger than an open degree of the first oil hole 211 in response to that the valve core 2 operates in the second working position.

In some embodiments, the valve body 1 is provided with a valve core cavity 13, and the valve core 2 is slidably installed in the valve core cavity 13 along its axial direction. The first end of the valve body 1 along the sliding direction of the valve core 2 is closed, and the first oil port 11 is opened on one side of the valve body 1 along the sliding direction of the valve core 2. The cavity formed between the first end of the valve body 1 and the first end of the valve core 2 is the first back cavity. The first back cavity and the first oil port 11 are communicated through the oil passage 14 to form the first feedback oil path 4.

The second oil port 12 is opened at the second end of the valve body 1 in the sliding direction of the valve core 2, and a cavity opened axially is formed between the valve body 1 and the valve core 2. The cavity is communicated with the second oil port 12 and an oil passage along the axial direction of the valve core 2 formed by the cavity 21, and this oil passage is the second feedback oil path 5. During the sliding process of the valve core 2, the cavity 21 is always communicated with the first oil port 11 and the second oil port 12.

The oil drain valve 100 is installed on the oil outlet of the accumulator 200, and the second oil port 12 is communicated with the oil outlet of the accumulator 200. In response to that the accumulator 200 discharges oil, the hydraulic oil in the accumulator 200 enters the oil drain valve 100 along the axial direction of the valve core 2, and then is discharged from the first oil port 11 through the cavity 21 along the radial direction of the valve core 2. In response to that the accumulator 200 is filled with oil, external hydraulic oil enters the cavity 21 from the first oil port 11 along the radial direction of the valve core 2, and then is charged into the accumulator 200 from the second oil port 12 along the axial direction of the valve core 2.

It should be noted that the second oil port 12 can also be opened on one side of the valve body 1 in the sliding direction of the valve core 2, and the second end of the valve body 1 in the sliding direction of the valve core 2 is closed, so that the cavity formed between the second end of the valve body 1 and the second end of the valve core 2 is a second back cavity, and the second back cavity is communicated with the second oil port 12 to form the second feedback oil path 5.

As shown in FIG. 4, in response to that the oil drain valve 100 is in a stable oil-charging state, hydraulic oil enters the oil drain valve 100 from the first oil port 11. A part of the hydraulic oil flows into the cavity 21 from the first oil port 11, and the other part of the hydraulic oil flows into the first back cavity through the oil passage 14. At this time, the first end and the second end of the valve core 2 are subjected to the same hydraulic force. The valve core 2 is maintained at the first working position under the action of the elastic element to ensure that the opening of the first oil hole 211 on the valve core 2 is maximized to achieve large-flow oil filling.

As shown in FIG. 5, in response to that the oil drain valve 100 switches from the above-mentioned oil charging state to the oil discharging state, due to the change in the flow direction of the hydraulic oil, the hydraulic oil entering the second feedback oil path 5 generates a steady-hydrodynamic force, and the steady-hydrodynamic force gradually increases. In response to that the resultant force of the steady-hydrodynamic force and the hydraulic force acting on the second end of the valve core 2 is greater than the resultant force of the hydraulic force and the elastic force acting on the first end of the valve core 2, the valve core 2 is pushed to the right and the valve core 2 is switched to the second working position. At this time, the opening of the first oil hole 211 on the valve core 2 is reduced, so that the first oil port 11 outputs hydraulic oil in a small amount.

In response to that the oil drain valve 100 switches from the above oil discharging state to the oil charging state, due to the change in the flow direction of the hydraulic oil and the throttling effect of the first oil hole 211, the force of the hydraulic oil on the first end of the valve core 2 is greater than the force of the hydraulic oil exerted on the second end of the valve core 2, thereby pushing the valve core 2 to move to the left and switching the valve core 2 to the first working position. At this time, the opening of the first oil hole 211 on the valve core 2 returns to the maximum opening, allowing the second oil port 12 to output hydraulic oil in a large flow amount.

As shown in FIG. 1 and FIG. 2, in some embodiments of the present application, the oil drain valve 100 further includes a damping element 6 provided on the first feedback oil path 4. The damping element 6 can be a damping hole, and a damper or an electronically controlled proportional flow valve is provided on the first feedback oil path 4.

In response to that the valve core 2 of the oil drain valve 100 operates in the first working position, the hydraulic oil flow direction is switched from the direction of the first oil port 11 to the second oil port 12 to the direction of the second oil port 12 to the first oil port 11. At this time, due to the damping element 6, the hydraulic pressure acting on the first end of the valve core 2 cannot be unloaded immediately, so that the valve core 2 remains in the first working position for a certain period of time. In this way, the accumulator 200 has a higher outlet flow quantity to meet the large flow demand of the working components in the early stage.

After a certain period of time, as the hydraulic oil is discharged from the first feedback oil path 4 to the first oil port 11, the hydraulic force acting on the first end of the valve core 2 decreases. In response to that the hydraulic pressure acting on the second end of the valve core 2 is greater than the hydraulic pressure acting on the first end of the valve core 2, the valve core 2 switches to the second working position to discharge oil in a small flow amount, thereby avoiding the actuator at the end of the stroke from producing a large rigid impact.

The hydraulic system of different types of actuators can be matched by replacing damping elements 6 of different sizes. FIG. 3 shows a schematic diagram of working principle of the oil drain valve provided by this application.

In some embodiments of the present application, the damping element 6 is an adjustable damper. Such that the delay time for the oil drain valve 100 to switch from the first working position to the second working position can be adjusted by adjusting the damper, thereby matching the hydraulic system of different types of actuators.

In other embodiments of the present application, an electronically controlled proportional flow valve is used as the damping element 6, which can also adjust the delay time for the oil drain valve 100 to switch from the first working position to the second working position.

In some embodiments of the present application, the valve body 1 includes a valve seat 15 and a valve sleeve 16. The first oil port 11 and the second oil port 12 are both provided on the valve seat 15. The valve seat 15 is provided with a valve core cavity 13, and the valve sleeve 16 is fixedly provided in the valve core cavity 13. The valve core 2 is slidably provided in the valve sleeve 16, a second oil hole 162 is provided on a side wall of the valve sleeve 16, and the second oil hole 162 is communicated with the first oil port 11 and the first oil hole 211.

The first end of the valve sleeve 16 corresponds to the first end of the valve core 2 and both are communicated with the first oil port 11. The second end of the valve sleeve 16 corresponds to the second end of the valve core 2 and both are communicated with the second oil port 12.

In some embodiments of the present application, the first back cavity is formed between the first end of the valve core 2 and a first end of the valve sleeve 16, the valve sleeve 16 is provided with a damping hole 161, and the damping hole 161 is communicated with the first back cavity and the oil passage 14. The damping hole 161 serves as the damping element 6 on the first feedback oil path 4 shown in FIG. 1 to FIG. 3, or the damping element 6 is installed at the damping hole 161 to make the valve core 2 switch from the first working position to the second working position under the action of the hydraulic pressure after a certain period of time.

In some embodiment, a buffer cavity 17 is formed between the first end of the valve sleeve 16 and the valve seat 15, and the buffer cavity 17 is communicated with the damping hole 161 and the oil passage 14. The damping hole 161 is provided at the first end of the valve sleeve 16. In some embodiments, the central axis of the damping hole 161 coincides with the central axis of the valve core 2. The first oil port 11, the oil passage 14, the buffer chamber 17, the damping hole 161 and the first back cavity are communicated in sequence to form the first feedback oil path 4.

In some embodiments of the present application, an inner surface of the valve core cavity 13 is provided with a first annular guide groove 18, an inner surface of the valve sleeve 16 is provided with a second annular guide groove 163. The first oil port 11, the first annular guide groove 18, the second oil hole 162 and the second annular guide groove 163 are communicated with the first oil hole 211 in sequence. The first oil hole 211 includes a plurality of first through holes distributed along a circumferential direction of the valve core 2 and on the side wall of the cavity 21, and the second oil hole 162 includes a plurality of second through holes distributed along a circumferential direction of the valve sleeve 16 and on the side wall of the valve sleeve 16.

The hydraulic oil entering the cavity 21 from the second oil port 12 can enter the first annular guide groove 18 from the plurality of first through holes provided circumferentially on the valve core 2, and then from the plurality of second through holes circumferentially provided on the valve sleeve 16 to the second annular guide groove 163 and finally flow out from the first oil port 11.

In some embodiments of the present application, the first oil hole 211 includes a plurality of first through holes distributed along an axial direction of the valve core 2 and on the side wall of the cavity 21, and a diameter of a first through hole near the second end of the valve core 2 is smaller than a diameter of a first through hole away from the second end of the valve core 2. In this way, in response to that the valve core 2 switches from the first working position to the second working position, the oil drain flow can be controlled by moving a smaller stroke, which is beneficial to reducing the volume of the oil drain valve 100. Correspondingly, the second oil hole 162 includes a plurality of second through holes distributed on the side wall of the valve sleeve 16 along the axial direction of the valve sleeve 16.

In some embodiments, a plurality of first through holes distributed along the circumferential direction of the valve core 2 on the side wall of the cavity 21 form a first oil hole group. The first oil hole 211 includes a plurality of first through hole groups distributed along the axial direction of the valve core 2 on the side of the cavity 21. That is to say, the plurality of first through holes are provided in a matrix on the side wall of the cavity 21. Correspondingly, a plurality of second through holes provided along the circumferential direction of the valve sleeve 16 on the side wall of the valve sleeve 16 form a second oil hole group. The second oil hole 162 includes a plurality of first through hole groups axially distributed along the axial direction of the valve sleeve 16 on the side of the valve sleeve 16. That is to say, the plurality of second oil holes are provided in a matrix on the side wall of the valve sleeve 16.

The present application also provides an energy accumulation device, and the energy accumulation device includes an accumulator 200 and the oil drain valve of any one above. The oil drain valve 100 is installed at an oil outlet of the accumulator 200, and the oil outlet of the accumulator 200 is communicated with the second oil port 12.

The second oil port 12 of the oil drain valve 100 and the oil outlet of the accumulator 200 can be fixedly connected, so that the oil drain valve 100 and the accumulator 200 are integrated into a whole, which facilitates the installation of the energy accumulation device. Alternatively, the second oil port 12 of the oil drain valve 100 and the oil outlet of the accumulator 200 can be detachably connected through threads or flanges to facilitate the installation, disassembly and replacement of the oil drain valve 100 and the accumulator 200.

The present application also provides a hydraulic system. The hydraulic system includes an oil pump, an actuator, an accumulator 200 and the oil drain valve 100 of any one above. The first oil port 11 is communicated with an oil outlet of the oil pump and a working oil port of the actuator respectively, and the second oil port 12 is communicated with an oil outlet of the accumulator; or the hydraulic system includes an oil pump, an actuator and the energy accumulation device of any one above. An oil outlet of the oil pump is communicated with the first oil port 11, and the first oil port 11 is communicated with a working oil port of the actuator.

The oil pump is used to charge hydraulic oil into the accumulator 200 or the energy accumulation device. The accumulator 200 is used to deliver hydraulic oil to the actuator in response to that the actuator is unloaded. By arranging the oil drain valve 100 provided in the present application, the amount of hydraulic oil delivered by the accumulator 200 to the actuator can be controlled, preventing the accumulator 200 from causing a large impact on the actuator during the oil draining process, so as to protect the actuator.

Furthermore, the oil pump can be used as a power source for the actuator, that is to say, the accumulator and the actuator share a power source. The hydraulic system also includes a reversing valve, and the oil pump is communicated with the actuator through the reversing valve. The reversing valve includes a first reversing port, a second reversing port, an oil inlet and an oil return port. The oil outlet of the oil pump is communicated with the oil inlet of the reversing valve and the first oil port 11 of the oil drain valve 100 respectively. The first reversing port and the second reversing port are respectively communicated with the first control oil port and the second control port of the actuator, and the oil return port of the reversing valve is communicated to the oil tank.

The reversing valve is provided with a first working position and a second working position. In response to that the valve core of the reversing valve operates in the first working position, the oil inlet of the reversing valve is communicated with the first reversing port, and the oil return port of the reversing valve is communicated with the second reversing port. In response to that the valve core of the reversing valve operates in the second working position, the oil inlet of the reversing valve is communicated with the second reversing port, and the oil return port of the reversing valve is communicated with the first reversing port.

In response to that the actuator is a hydraulic cylinder, the first control oil port is communicated with the cantilever chamber of the hydraulic cylinder, and the second control oil port is communicated to the leveraged chamber of the hydraulic cylinder. During the operation of the hydraulic system, in response to that the valve core of the reversing valve operates in the first working position, part of the hydraulic oil pumped out by the oil pump enters the cantilever chamber of the hydraulic cylinder through the oil inlet of the reversing valve and the first reversing port to drive the piston of the working cylinder to extend to work; the other part enters the accumulator 200 through the first oil port 11 to charge the accumulator 200 with oil.

In response to that the valve core of the reversing valve operates in the second working position, the hydraulic oil pumped out by the oil pump enters the leveraged chamber of the working cylinder through the oil inlet and the second reversing port of the reversing valve to drive the piston of the working cylinder to retract. At the same time, the accumulator 200 enters the oil discharging state and also delivers hydraulic oil to the leveraged chamber of the working cylinder to drive the piston of the working cylinder to accelerate retraction.

In some embodiments, the damping element 6 is provided on the first feedback oil path 4 of the oil drain valve 100. Within a period after the core valve of the reversing valve switches from the first working position to the second working position, that is within a period after the valve core switches from the oil charging state to the oil discharging state, the oil drain valve 100 can be configured, the piston of the working cylinder can contract at a faster speed. After a period of time, the valve core of the oil drain valve 100 is switched to the second working position, so that the output flow of the accumulator 200 is reduced to reduce the oil supply to the leveraged chamber of the working cylinder, thereby preventing the piston from rigidly impacting the cylinder at the end of the stroke.

The present application also provides a working machine. The working machine may be a pump truck, a vehicle-mounted pump, a towing pump, a crane, a fire truck and other working machines. The working machine includes the hydraulic system of any one above. In response to that the working machine is a concrete pump truck, the actuator includes a first swing cylinder and a second swing cylinder. The cantilever chamber of the first swing cylinder is communicated with the first reversing port of the reversing valve. The leveraged chamber of the first swing cylinder is communicated with the leveraged chamber of the second swing cylinder. The cantilever chamber of the second swing cylinder is communicated with the second reversing port of the reversing valve.

Finally, it should be noted that the above embodiments are only used to illustrate the technical solution of the present application, but not to limit it; although the present application has been described in detail with reference to the foregoing embodiments, those skilled in the art should understand that modifications can be made to the technical solutions described in the foregoing embodiments, or equivalent substitutions can be made to some of the technical features. However, these modifications or substitutions do not cause the essence of the corresponding technical solutions to deviate from the spirit and scope of the technical solutions in the embodiments of the present application.

What is claimed is:

1. An oil drain valve, comprising a valve body, a valve core and an elastic element; wherein the valve body is provided with a first oil port and a second oil port, and the valve core is provided between the first oil port and the second oil port; the valve core is communicated with the first oil port and the second oil port, and the valve core is movable in the valve body to switch from a first working position to a second working position;

the elastic element is provided between a first end of the valve core and the valve body, the first end of the valve core is communicated with the first oil port, and a second end of the valve core is communicated with the second oil port;

in response to hydraulic oil in the oil drain valve flows from the first oil port to the second oil port, the valve core is configured to switch from the second working position to the first working position under an action of the elastic element;

in response to the hydraulic oil in the oil drain valve flows from the second oil port to the first oil port, the valve core is configured to compress the elastic element and switch from the first working position to the second working position; and a flow quantity of the oil drain valve in response to the valve core operates in the second working position is less than a flow quantity of the oil drain valve in response to the valve core operates in the first working position;

wherein an oil passage is provided in the valve body; a first back cavity is formed between the first end of the valve core and the valve body, and the elastic element is provided in the first back cavity; the oil passage is configured to communicate with the first back cavity and the first oil port to form a first feedback oil path; and the second end of the valve core is provided with a cavity communicated with the second oil port; a side wall of the cavity is provided with a first oil hole, and the cavity is communicated with the first oil port through the first oil hole; an open degree of the first oil hole in response to that the valve core operates in the first working position is larger than an open degree of the first oil hole in response to that the valve core operates in the second working position;

wherein the valve body comprises a valve seat and a valve sleeve; the first oil port and the second oil port are both provided on the valve seat, and the valve seat is provided with a valve core cavity; the valve sleeve is fixedly provided in the valve core cavity, and the valve core is slidably provided in the valve sleeve; a second oil hole is provided on a side wall of the valve sleeve, and the second oil hole is communicated with the first oil port and the first oil hole.

2. The oil drain valve of claim 1, wherein in response to the valve core operates in the first working position and the second working position, the elastic element is in a compressed state, and an elastic force of the elastic element in response to the valve core operates in the first working position is smaller than an elastic force in response to the valve core operates in the second working position.

3. The oil drain valve of claim 1, further comprising a damping element provided on the first feedback oil path.

4. The oil drain valve of claim 3, wherein the damping element is any one of a damping hole, a damper and an electronically controlled proportional flow valve.

5. The oil drain valve of claim 1, wherein the first back cavity is formed between the first end of the valve core and a first end of the valve sleeve; the valve sleeve is provided with a damping hole, and the damping hole is communicated with the first back cavity and the oil passage.

6. The oil drain valve of claim 1, wherein an inner surface of the valve core cavity is provided with a first annular guide groove, and an inner surface of the valve sleeve is provided with a second annular guide groove; the first oil port, the first annular guide groove, the second oil hole and the second annular guide groove are communicated with the first oil hole in sequence; and the first oil hole comprises a plurality of first through holes provided on the side wall of the cavity and distributed along a circumferential direction of the valve core, and the second oil hole comprises a plurality of second through holes provided on the side wall of the valve sleeve and distributed along a circumferential direction of the valve sleeve.

7. The oil drain valve of claim 1, wherein the first oil hole comprises a plurality of first through holes provided on the side wall of the cavity and distributed along an axial direction of the valve core, and a diameter of a first through hole near the second end of the valve core is smaller than a diameter of a first through hole away from the second end of the valve core.

8. The oil drain valve of claim 1, wherein the elastic element is a return spring.

9. An energy accumulation device, comprising an accumulator and the oil drain valve of claim 1, wherein the oil drain valve is installed at an oil outlet of the accumulator, and the oil outlet of the accumulator is communicated with the second oil port.

* * * * *